March 22, 1966 W. R. DRYSDALE 3,241,535
VACUUM FLOW CONTROL FOR CRANKCASE VENTILATION
Filed Jan. 20, 1964

United States Patent Office 3,241,535
Patented Mar. 22, 1966

3,241,535
VACUUM FLOW CONTROL FOR CRANKCASE VENTILATION
William R. Drysdale, Hayward, Calif., assignor to Fog-Aire, Inc., Oakland, Calif., a corporation of California
Filed Jan. 20, 1964, Ser. No. 339,005
5 Claims. (Cl. 123—119)

This invention relates to vacuum controlled ventilation of internal combustion engines as used on automotive vehicles.

It is known that vapors of oils, gasoline, acids, and water are found in the oil pan and lower crankcase of internal combustion engines where they become mixed with the oil and render it less effective.

To prevent this result, it is known in the art to apply a tube or conduit to the upper part of the crankcase and connect this tube or conduit to the intake manifold of the engine so that the suction of the manifold will draw unburned vapors from the crankcase through the tube or conduit and deliver them to the combustion chamber where they are burned and expelled in due process past the exhaust valve and out the exhaust pipe.

The flow of gases from the crankcase through the tube or conduit must be controlled to provide for uniform flow as the speed of the engine changes.

To control the flow of gases through the tube or conduit from the crankcase a tube or conduit is placed into communication with the chamber of the carburetor just above the carburetor throttle valve and below the venturi and fuel jets in the carburetor.

A second tube or conduit is placed outside the carburetor from the tube or conduit into the carburetor, and run to the manifold immediately below the throttle valve in the carburetor, to control the flow of fumes or gases from the crankcase when the engine idles.

When the throttle valve is closed a small amount of gases and fumes from the crankcase flow through the second tube or conduit to the limit of the appropriate orifice in the manifold for the correct idle speed.

The flow of gases through the tube or conduit from the crankcase to the carburetor is controlled by the opening or closing of the throttle valve in the carburetor, to increase or decrease the vacuum in the crankcase as the blowby charges into the crankcase.

The orifices in each tube or conduit control the maximum flow of gases from the crankcase to the carburetor and manifold for the required mixture of gases to the engine.

It is the object of the present invention to provide a vacuum control means or members which can be controlled by the throttle valve in the carburetor, and manufactured at very reasonable cost, having no other valves.

Another object of the invention is to provide a connection into the carburetor, below the gasoline jets and venturi, above the throttle valve in the carburetor, to prevent fouling of the gasoline jets and upper parts of the carburetor by gases, oil fumes and carbon from the crankcase.

The vacuum in the tube or conduit to the crankcase will increase as the throttle valve in the carburetor is opened and the blowby increases in the crankcase.

These, together with other objects and advantages, will become apparent from the details of construction and operation as more fully described and claimed hereinafter, reference being had to the accompanying description and drawings, wherein like numerals refer to like parts throughout.

Figure 1:
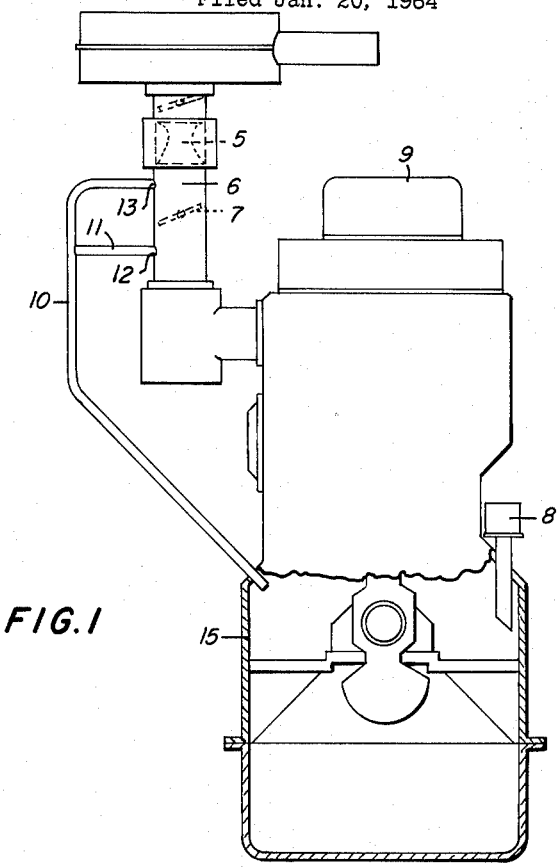
FIGURE 1 is an end view of an internal combustion engine with the invention applied.

A crankcase 15 is provided with the usual filler pipe vent opening 8 for the air to enter. The air is drawn by suction at the intake manifold through the crankcase 15, picks up blowby gases and oil fumes, as drawn through the valve cover 9 or other compartment of crankcase, and then passes into tube or conduit 10 through orifice 13 into carburetor chamber 6 between venturi 5 and throttle valve 7 so as not to enrich the mixture and flow of fumes as controlled by the throttle valve in the carburetor. The drawn air and gases in conduit 10 pass through tube or conduit 11 and orifice 12 when throttle valve is closed for idling of the engine only.

Figure 2:
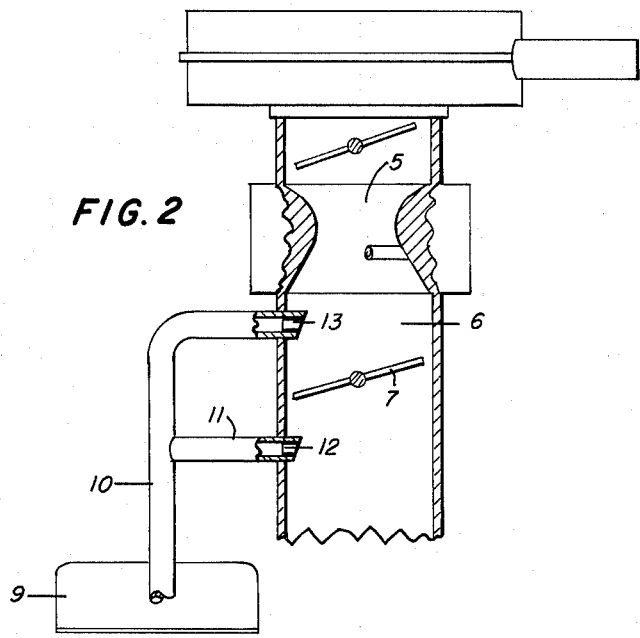
FIGURE 2 is an enlarged fragmentary view partly in section of the invention.

In FIGURE 2 there is an enlarged showing of the conduit 10 leading from the crankcase to the carburetor chamber 6 above the throttle valve 7 and conduit 11 below the throttle valve 7 that controls the flow through conduit 10 and orifices 13 and 12 so that the vacuum in the crankcase 15 will be maintained at or near even flow through the crankcase 15 and other compartments and so that there will be no discharge of fumes from oil filler pipe and cap 8.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

Having thus completely and more fully described the invention, what is now claimed as new is as follows:

1. A vacuum flow control device for crankcase ventilation for an internal combustion engine having an oil filler pipe and an intake manifold, comprising conduit means providing a free passageway between the crankcase compartments and the carburetor chamber above the throttle valve and below the venturi and gasoline jets in the carburetor.

2. A vacuum flow control device according to claim 1, in which the free passageway provided by said conduit means is gauged to limit the maximum flow of blowby fumes to the carburetor above the throttle valve to an amount correlated with the absence of a discharge of fumes from the oil filler pipe.

3. A vacuum flow control device according to claim 1, in which a second conduit means provides a free passageway between the crankcase compartments and the manifold below the throttle valve in the carburetor, the free passageway provided by said second conduit means being gauged in correlation to the volume of fumes generated when the throttle valve in the carburetor is closed and the engine is idling.

4. A vacuum flow control device for an internal combustion engine having a crankcase and an induction system including a carburetor providing a chamber enclosing a venturi and an intake manifold having a throttle valve, comprising conduit means providing free passageways connecting said crankcase with said induction system on both sides of said throttle valve on the downstream side of said venturi, said free passageways being gauged to equalize the pressure in said induction system on one side of the throttle valve with the pressure in the crankcase when the engine is running with throttle open and to equalize the pressure on the other side of the throttle valve with the pressure in the crankcase when the throttle is closed and the engine is idling, said equalizations of pressure being effected by variations in pressure in said induction system.

5. In an internal combustion engine having a crankcase and an induction system including a carburetor providing a chamber enclosing a venturi and an intake manifold having a throttle valve, the method of maintaining the pressure in the crankcase below atmospheric pressure at all engine speeds, consisting of maintaining free passageways connecting the crankcase with the induction system on both sides of said throttle valve on the downstream side of said venturi, gauging said free passageways to equalize the pressure in the crankcase with the pressure in said carburetor venturi chamber when the engine is operating with the throttle open and to equalize the pressure in the crankcase with the pressure in said intake manifold when the engine is idling.

References Cited by the Examiner
UNITED STATES PATENTS

| | | | |
|---|---|---|---|
| 2,281,124 | 4/1942 | Westcott | 123—119 |
| 2,489,230 | 11/1949 | Winkler | 123—119 |

KARL J. ALBRECHT, *Primary Examiner.*